(12) United States Patent
Grevers, Jr.

(10) Patent No.: US 9,800,950 B2
(45) Date of Patent: Oct. 24, 2017

(54) CONTEXT AWARE GEO-TARGETED ADVERTISEMENT IN A COMMUNICATION SESSION

(71) Applicant: Cisco Technology, Inc., San Jose, CA (US)

(72) Inventor: Theodore Robert Grevers, Jr., Milford, MA (US)

(73) Assignee: Cisco Technology, Inc., San Jose, CA (US)

( * ) Notice: Subject to any disclaimer, the term of this patent is extended or adjusted under 35 U.S.C. 154(b) by 465 days.

(21) Appl. No.: 14/103,154

(22) Filed: Dec. 11, 2013

(65) Prior Publication Data
US 2015/0163561 A1    Jun. 11, 2015

(51) Int. Cl.
| G10L 15/00 | (2013.01) |
|---|---|
| G10L 15/26 | (2006.01) |
| H04N 21/81 | (2011.01) |
| H04N 21/4788 | (2011.01) |
| H04N 21/45 | (2011.01) |

(Continued)

(52) U.S. Cl.
CPC ....... *H04N 21/812* (2013.01); *G06Q 30/0241* (2013.01); *G10L 25/48* (2013.01); *H04N 21/2668* (2013.01); *H04N 21/4223* (2013.01); *H04N 21/42203* (2013.01); *H04N 21/4394* (2013.01); *H04N 21/4524* (2013.01);

(Continued)

(58) Field of Classification Search
CPC ....... H04W 4/003; H04W 4/02; H04W 64/00; G06Q 30/02; G06Q 30/0261; G06Q 30/0251; G06Q 30/0241; G06Q 30/00; G06Q 30/0271; G06Q 30/0276; G06Q 30/0277; G06Q 30/0631; H04M 3/4878; H04M 15/8033
See application file for complete search history.

(56) References Cited

U.S. PATENT DOCUMENTS

| 7,123,926 B2 | 10/2006 | Himmelstein |
|---|---|---|
| 7,610,597 B1 | 10/2009 | Johnson et al. |

(Continued)

OTHER PUBLICATIONS

Computer World, "Google Voice: Press "1" to Invade Your Privacy", blog, Published Mar. 12, 2009, printed Oct. 17, 2013,blogs.computerworld.com/google_voice_press_1_to_invade_your_privacy, 5 pages.

(Continued)

*Primary Examiner* — Michael Ortiz Sanchez
(74) *Attorney, Agent, or Firm* — Edell, Shapiro & Finnan, LLC (57) ABSTRACT

Techniques are provided for capturing audio containing speech at an endpoint device, converting the audio into corresponding text, identifying one or more keywords from the corresponding text and determining geolocation information associated with the endpoint device. Both the one or more keywords and the geolocation information are supplied as input to a geo-targeting advertisement service so as to cause the geo-targeting advertisement service to identify relevant content based on both the geolocation information and the one or more keywords. The geo-targeting advertisement service provides one or more advertisements to an endpoint device for display, wherein the advertisements are based on the one or more keywords and the geolocation information.

24 Claims, 7 Drawing Sheets

(51) Int. Cl.
  *H04N 21/439* (2011.01)
  *H04N 21/4223* (2011.01)
  *H04N 21/422* (2011.01)
  *H04N 21/2668* (2011.01)
  *G06Q 30/02* (2012.01)
  *G10L 25/48* (2013.01)
  *H04N 7/15* (2006.01)

(52) U.S. Cl.
  CPC ......... *H04N 21/4788* (2013.01); *G10L 15/26* (2013.01); *H04N 7/15* (2013.01)

(56) References Cited

U.S. PATENT DOCUMENTS

| | | |
|---|---|---|
| RE41,701 E | 9/2010 | Domnitz |
| 7,970,389 B2 | 6/2011 | Ramer et al. |
| 8,065,156 B2 | 11/2011 | Gazdzinski |
| 8,074,882 B2 | 12/2011 | Dmitriev et al. |
| 8,270,955 B2 | 9/2012 | Ramer et al. |
| 8,554,625 B2 | 10/2013 | Agarwal et al. |
| 8,554,852 B2 | 10/2013 | Burnim |
| 2002/0033848 A1* | 3/2002 | Sciammarella ....... G06F 3/0481 715/838 |
| 2006/0184417 A1* | 8/2006 | Van der Linden ..... G06Q 30/02 705/14.46 |
| 2007/0174258 A1* | 7/2007 | Jones ....................... G06Q 30/02 |
| 2008/0221879 A1* | 9/2008 | Cerra ....................... G10L 15/30 704/235 |
| 2008/0244408 A1* | 10/2008 | King ................. G06F 17/30864 |
| 2009/0076917 A1* | 3/2009 | Jablokov ............ G06Q 30/0239 705/14.39 |
| 2009/0119172 A1* | 5/2009 | Soloff ..................... G06Q 30/02 705/344 |
| 2009/0193134 A1* | 7/2009 | Moore ............... H04N 21/2181 709/231 |
| 2009/0217319 A1* | 8/2009 | Weiss ................. G06Q 30/0264 725/34 |
| 2009/0239663 A1* | 9/2009 | Ferdinand .............. G06Q 30/02 463/29 |
| 2009/0304169 A1* | 12/2009 | Chow ................. H04M 3/4878 379/201.01 |
| 2010/0086107 A1* | 4/2010 | Tzruya ................ H04M 3/2281 379/88.01 |
| 2010/0094707 A1* | 4/2010 | Freer ...................... G06Q 30/02 705/14.54 |
| 2010/0241507 A1* | 9/2010 | Quinn .................... G06Q 30/02 705/14.42 |
| 2011/0035283 A1* | 2/2011 | Min ....................... G06Q 30/02 705/14.58 |
| 2011/0035458 A1* | 2/2011 | Burnim .................. G06Q 30/02 709/206 |
| 2012/0035993 A1* | 2/2012 | Nangia .................. G06Q 30/02 705/14.4 |
| 2012/0110618 A1* | 5/2012 | Kilar ...................... G06Q 30/02 725/34 |
| 2012/0303445 A1* | 11/2012 | Jablokov ................ G06Q 30/02 705/14.42 |
| 2012/0323679 A1* | 12/2012 | Yang ................... G06Q 30/0241 705/14.49 |
| 2013/0073388 A1* | 3/2013 | Heath .................... G06Q 50/01 705/14.53 |
| 2013/0073389 A1* | 3/2013 | Heath .................... G06Q 50/01 705/14.54 |
| 2013/0073473 A1* | 3/2013 | Heath .................... G06Q 50/01 705/319 |
| 2013/0212534 A1* | 8/2013 | Knight .................. G06F 3/0482 715/838 |
| 2014/0066105 A1* | 3/2014 | Bridge ................ H04L 65/1003 455/457 |
| 2014/0314215 A1* | 10/2014 | Duva ................. G06Q 30/0202 379/88.01 |
| 2014/0324431 A1* | 10/2014 | Teasley ................... G10L 15/22 704/246 |

OTHER PUBLICATIONS

Pinger, Inc., "Pinger: Text Free + Call Free", product information, Sep. 10, 2013, printed Sep. 25, 2013, https://play.google.com/store/apps/details?id=com.pinger.ppa&hl=en, 4 pages.

* cited by examiner

CONTEXT AWARE GEO-TARGETED ADVERTISEMENT IN A COMMUNICATION SESSION

TECHNICAL FIELD

The present disclosure relates to geo-targeted advertisements, and in particular, advertisements that are targeted to a particular user based upon a location of the user and user input, e.g., voice.

BACKGROUND

Video conference communication is projected to substantially increase in the immediate future, with access to video conference products becoming accessible in a variety of venues, including video kiosks, mobile devices, as well as video conferencing services within hotels or other public places. In certain venues, service providers may offer video conferencing services at no additional cost to a user. In such situations, video conferencing, which may consume large amounts of bandwidth, may be associated with considerable costs that are passed along to the service provider. In order to offset such costs, service providers will seek methods to offset the cost of video conferencing capability. Accordingly, revenues generated by advertising may be one way to offset such costs.

DESCRIPTION OF EXAMPLE EMBODIMENTS

Overview

Techniques are provided for sending information to a geo-targeting advertising service and displaying retrieved advertisements on an endpoint (or user) device. In particular, user information may be obtained from a live communication session (e.g., a video call or teleconference) between one or more individuals at a first location and one or more individuals at a second location. The voice of a user in the communication session is used together with a user location in order to retrieve advertisements relevant to the communication session. In one example, advertisements may be retrieved that are targeted to businesses in local proximity to a user. Voice or audio containing speech at an endpoint device is captured, and the audio is converted into corresponding text. One or more keywords are identified from the corresponding text. In addition, geolocation information associated with the endpoint device is determined. Both the one or more keywords and the geolocation information are supplied as input to a geo-targeting advertisement service so as to cause the geo-targeting advertisement service to identify relevant content based on both the geolocation information and the one or more keywords. The endpoint device may then receive from the geo-targeting advertisement service one or more advertisements obtained by the geo-targeting advertisement service, based on the one or more keywords and the geolocation information. The endpoint device displays this information (e.g., one or more advertisements) to a user during the communication session and/or after the communication session.

Example Embodiments

Context aware advertising exists today for Internet search traffic, such as text within a given email, type of content watched on a cable set top box, live music streaming, as well as numerous other services. For example, when a user enters keywords into an Internet search engine, advertisement decisions may be triggered based upon these keywords, which result in targeted advertisements being displayed to a user.

As video call and conference communication increase in popularity, access to video conference products will become more widespread. For example, video kiosks are beginning to replace telephone booths, providing convenient public access to video conferencing services. Such video kiosks may be used for a live communication session between only two persons, or a communication session between more than two people. Example products include Cisco Systems' Remote Expert Smart Solution, which is beginning to be offered in commercial settings such as shopping malls and public video booths. Such video conferencing technology allows individuals to place video calls to e.g., family, friends, physicians, businesses, etc., in both local and remote locations. Other applications allow for cell phone to cell phone video communication, and may also interface with tablets and personal computers.

As video communication continues to grow, hotels, shopping malls or other public places are expected to offer video conferencing services as free or complementary services to the public. Accordingly, such services, which typically consume relatively large amounts of bandwidth, may incur significant costs to service providers that support such services. Thus, to offset such costs, service providers may choose to engage in advertising.

However, during a live or real-time video or audio communication session, a user has no interface to type in keywords, as the communication session is handled via a video or audio session that streams between two endpoints. Thus, in order to effectively target advertisements to particular users of video or teleconference services, advertising methods may be employed based on content of real-time or live video communication sessions between individuals (users) as well locations of particular users of the video or telecommunication service. The capability to convert audio to text exists on many SmartPhone devices and is also available in software applications. These products and software applications are intended to convert or translate spoken text into written text for messages, email, search and dictation.

Presented herein are techniques to convert the audio stream of the video/audio conference into keywords, which are presented in combination with geolocation information to a geo-targeting advertisement decision engine/service for the selection of real-time context aware advertisements. Once keyword and geo-targeting information have been received by a geo-targeting advertisement service, the geo-targeting advertisement service generates a response that is sent back to the requesting apparatus or device. Thus, techniques presented herein may operate in real-time (or substantially in real-time) to identify and gather keywords of interest during a live video-based communication session. Such keywords are used to identify and present advertisements that may be of interest to users participating in the communication, based on the context of their video communication session.

The techniques presented herein are applicable to live video or audio communication sessions that occur between a user at a first location and another user at a second location, a group of users at a first location and a user at a second location (or vice-versa), as well as a first group of users at a first location and a second group of users at a second location. Such techniques apply broadly to any type of person-to-person communication session that involves exchanging audio or video messages in real-time (or substantially real-time).

These concepts are described more fully below with regard to FIGS. 1-6. It should be noted, that although several of the concepts may be presented separately with regard to FIGS. 1-6, such disclosure is not intended to be limited to a specific embodiment or a particular hardware configuration. The concepts presented below may be combined into a single device or distributed across multiple devices.

Figure 1:
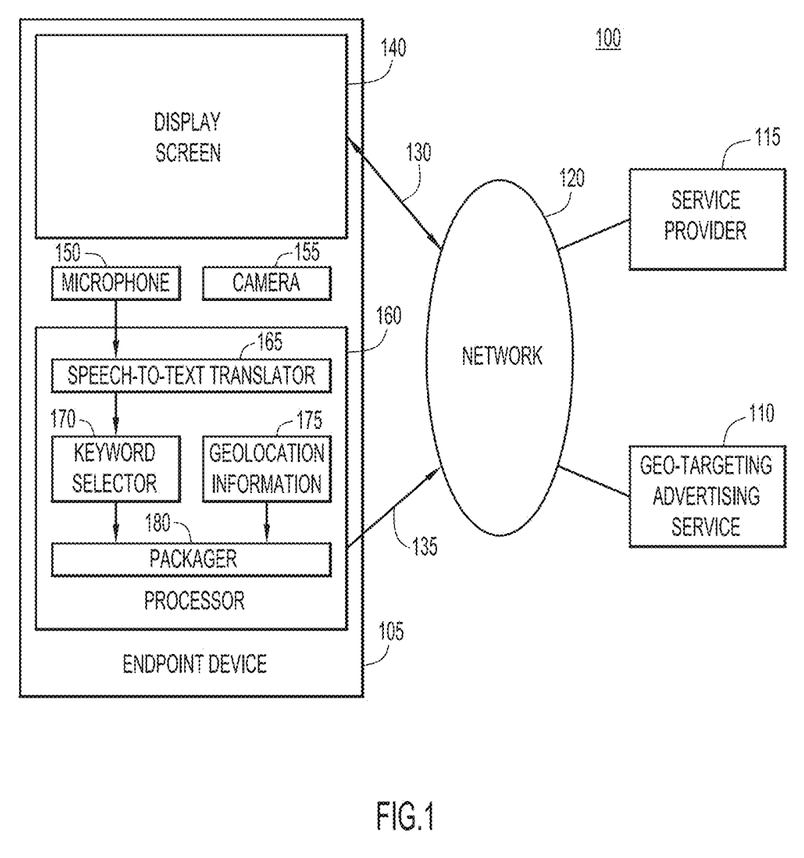
FIG. 1 is a block diagram of an example endpoint device, and showing various components that may be used to send information to a geo-targeting advertising service, according to the techniques disclosed herein.

FIG. 1 is a block diagram of system 100 including endpoint device 105 capable of sending information over network 120 to geo-targeting advertising service 110. The endpoint device 105 may be a computer terminal, video kiosk, Smartphone, tablet computer, or any other device having a display screen and capable of supporting video or audio communication. One or more servers of a service provider 115 support the communication session in which the endpoint device 105 is engaged. The geo-targeting advertising service 110 may be running on one of the servers of the service provider 115, or may be operated by a totally separate entity. Reference numeral 130 represents a communication session stream containing video, audio or other media content (such as shared content) that passes between the endpoint device 105 and the service provider 115. Though not shown in FIG. 1, it is to be understood that there are one or more other endpoint devices connected to the network 120 and to the service provider 115 that are involved in a communication session with the endpoint device 105. It is to be understood that the techniques disclosed herein apply to any suitable device, and are not limited to an endpoint device as described herein.

Network 120 may include any local area network, wide area network, wireless or hybrid network, capable of forwarding/routing messages between endpoint device 105 and geo-targeting advertising service 110, as well as directing streams between the endpoint device 105 and the service provider 115.

Endpoint device 105 may send information to geo-targeting advertising service 110, as well as receive and display information from geo-targeting advertising service 110. For example, the endpoint device 105 may send to the geo-targeting advertising service 110 information comprising one or more keywords derived from a video or audio communication session in combination with geographical location, and may receive from the geo-targeting advertising service 110 information including one or more advertisements, information associated with advertisements, and/or information used to retrieve advertisements.

The endpoint device 105 includes a display screen 140, a microphone 150 (integrated with a loudspeaker, not shown in FIG. 1 for simplicity), a video camera 155 and a processor 160 that executes several processes and manages information as shown in FIG. 1. Specifically, the processor 160 executes a speech-to-text translator/converter process 165 and a keyword selector process 170. The speech-to-text translator process 165 takes in audio captured by the microphone 150 and generates text (words) from the captured audio. The keyword selector process 170 selects from the text (words), generated by the speech-to-text translator process 165, meaningful "keywords" that may reveal goods/services of interest to the user of the endpoint device 105 during the communication session. In addition, the processor 160 obtains (and updates) geolocation information 175 of the endpoint device. The geolocation information 175 may be obtained using Global Positioning System (GPS) capabilities of the endpoint device 105 or other land-based triangulation techniques when the endpoint device 105 is a mobile device. If the endpoint device 105 is a stationary device, such as a kiosk, then the geolocation information 175 may be static and stored one-time in the endpoint device 105. The processor 160 also executes a packager process 180 that combines the one or more key words generated by keyword selector process 170 and the geolocation information 175 for transmission to the geo-targeting advertisement service 110.

As discussed previously, advertisements may be selected by the geo-targeting advertising service 110 based on keywords and vendors of goods or services in proximity to a user of the endpoint device for display on display screen 140. In some aspects, geo-targeting advertising service 110 may be engaged by one or more third party vendors to promote their products/services.

Speech-to-text translator process 165 may accept as input electrical energy waveforms or signals from microphone 150 and convert or translate such signals into corresponding text. This functionality of process 165 is known and further details thereof are thus not provided herein.

Keyword selector 170 may parse converted or translated text generated by speech to text translator 165, and generate as output one or more keywords to be provided to geo-targeting advertising service 110. In one example, keyword selector 170 may collect one or more keywords and/or phrases for packaging and distribution to geo-targeting advertising service 110. Geolocation information 175 may contain location information, e.g., using GPS technology, or in the event of stationary devices, location may be preconfigured and stored in memory of the endpoint device as described above. Packager process 180 may couple selected keywords or phrases with physical location and send this combined information to geo-targeting advertising service 110 over network connection 135.

The information sent to geo-targeting advertising service 110, which may comprise keywords and corresponding geolocation information combined by packager 180, may be formatted into a markup language format, e.g., an Extensible Markup Language (XML) format, which includes the keywords themselves, geographic data specific to the local user, such as his or her location, country, region or state, city, metro code or zip code, organization, Internet Protocol Address, or Internet Service Provider. The packager process 180 may generate XML messages as they are being sent by endpoint device 105 in real-time, that is, as the communication session between individuals is occurring. The combined or packaged data may be sent in accordance with the Extensible Messaging and Presence Protocol (XMPP) in an XML formatted message to geo-targeting advertisement service 110.

Sending messages to the advertising service 110 may begin upon initiation of a communication session. Communication session stream 130 may be used for sending or receiving video signals as part of a video call or conference between a user of endpoint device 105 and another individual(s), e.g., at one or more remote sites (not shown).

Figure 2:
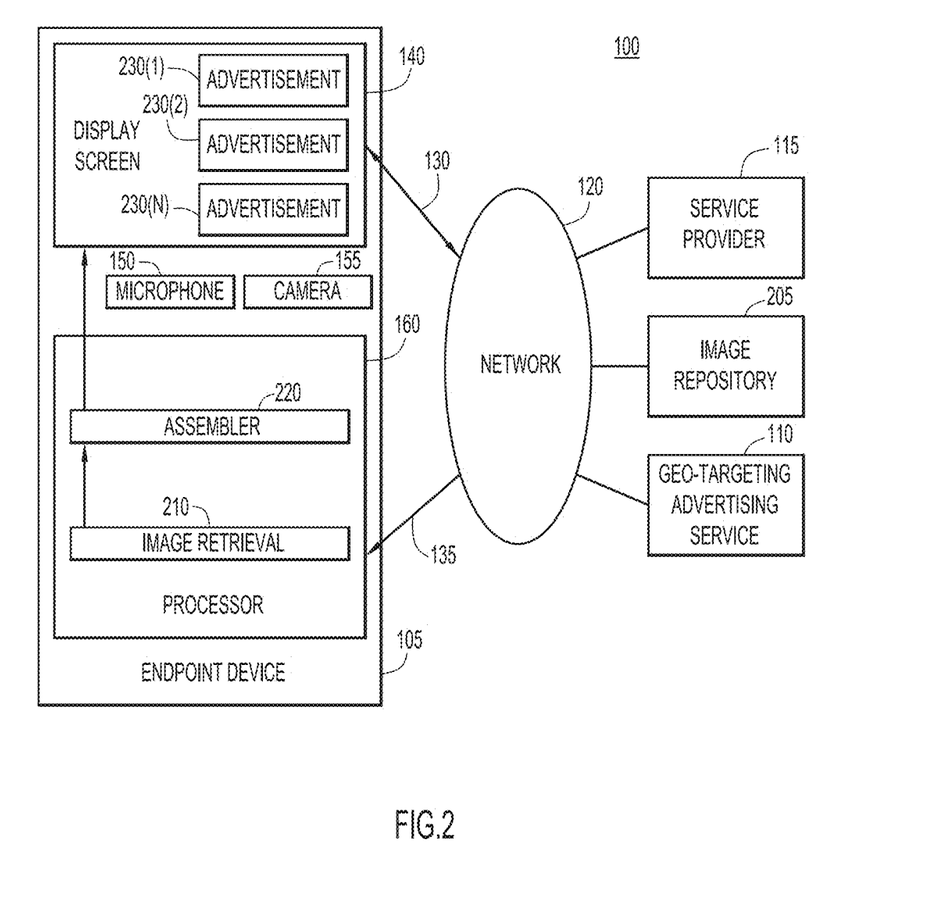
FIG. 2 is a block diagram of the example endpoint device of FIG. 1, and showing various components that may be used to receive information from the geo-targeting advertising service.

FIG. 2 shows another block diagram of endpoint device 105, with components for receiving messages from geo-targeting advertising service 110. As stated previously, the components discussed in FIG. 1 as well as the components in FIG. 2 may be present in the same endpoint device. Components are presented separately, as part of sending functionality and receiving functionality, purely for illustrative purposes.

FIG. 2 shows an image repository 205 to store images associated with Uniform Resource Locators (URLs), for display in connection with an advertisement sent to the endpoint device 105. Images stored in the image repository 205 may include any digital image that may be displayed on a computer display or printer, including thumbnail images, jpeg images, gif images, or any corresponding equivalent. Geo-targeting advertising service 110, in addition to having functionality discussed in conjunction with FIG. 1, also transmits messages via network 120 to endpoint device 105, which messages contain the advertisements (or links to advertisements) selected by the service on the basis of the received keywords and geolocation information of the endpoint device 105.

Endpoint device 105, in addition to functionality described in FIG. 1, also has components for receiving messages over network connection 135 and displaying advertisement related content contained or referenced in the messages from geo-targeting advertising service 110. The processor 160 includes an image retrieval process 210 for retrieving thumbnail or other images, and assembler process 220 for creating overlay images for presentation on display screen 140. Display data coupled to display screen 140 by processor 160 may be partitioned to display content of the video conference session (not shown) as well as advertisement(s) returned from the service 110 and corresponding to the spoken content of the communication session. Advertisements 230(1) to 230(N) are shown in FIG. 2 as an example and without regard to a specified order.

Geo-targeting advertisement service 110 may transmit a message or response, e.g., in XML format via XMPP, to endpoint device 105. The response may include data, e.g., in XML format, which identifies a thumbnail image, corresponding text, and a URL destination which may be selected by a user. The response from the advertisement service 110 is received by endpoint device 105, and formatted for visual presentation as an overlay onto a portion of the display screen 140, visible only to the local user(s) of endpoint device 105. In other words, the received advertisement would not be visible to remote users of the video or audio teleconference.

In one example, the endpoint device 105 may parse the formatted message, which may contain a URL to a thumbnail associated with the advertisement, which may be retrieved or fetched from the image repository 205 via an application protocol such as Hypertext Transfer Protocol (HTTP) or Hypertext Transfer Protocol Secure (HTTPS). In other words, the image retrieval process 210 may acquire an advertisement thumbnail by accessing image repository 205 via network 120. Once retrieved, the assembler process 220 creates an overlay which is forwarded to the display screen 140.

Figure 3A:
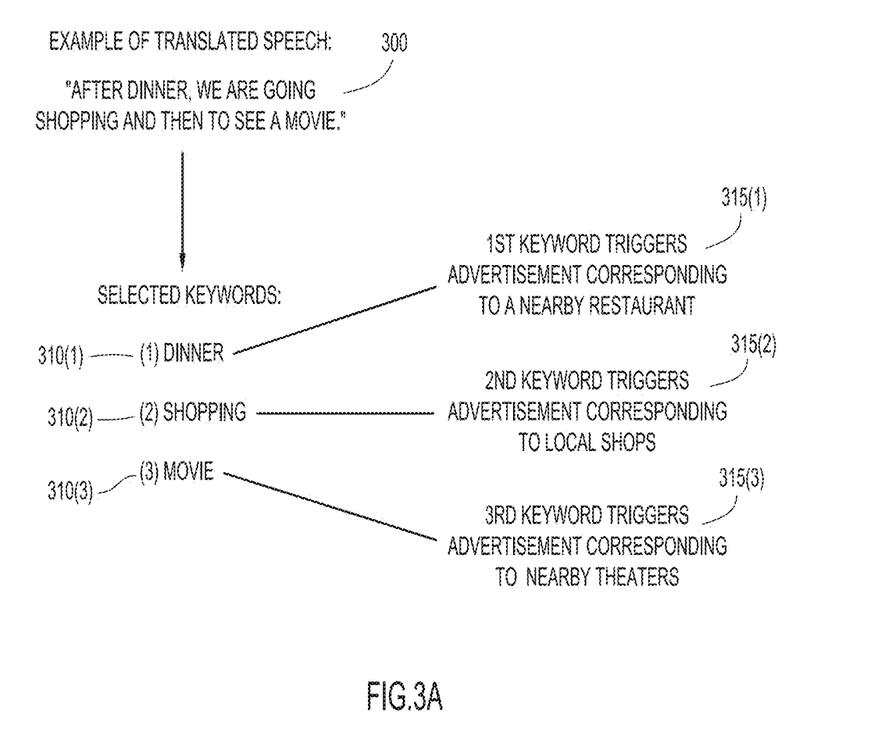
FIG. 3A is an illustration of keyword selection, with selected keywords subsequently provided to a geo-targeting advertising service, according to the techniques disclosed herein.

Reference is now made to FIG. 3A, with continuing reference to FIGS. 1 and 2. FIG. 3A illustrates an example of how output of speech-to-text translator process 165, e.g., translated speech shown at reference numeral 300, may be received as input into keyword selector process 170 to select relevant keywords 310(1) to 310(3). Selected keywords may correspond to places, events, objects, activities, etc.

Words that are deemed to be "noise" or "stop" words, that is, words that are so commonly used as to have no real meaning in the context of searches, will generally be ignored by keyword selector process 170. Examples of noise words may include: "the", "and, "of", etc. Keyword selector 170 may be configured with a list of words which are to be ignored during the keyword selection process. For example, words comprising a small number of characters may be ignored. The keyword selector process 170 may be configured to select a combination of words that may represent a particular event, place, object, etc. For example, instead of "Italian" and "Restaurant" being selected as two independent keywords, the keyword selector may select a combination of words, e.g., "Italian Restaurant" to send to geo-targeting advertisement service 110. Such customization may be based on the location of the endpoint device.

Still referring to FIG. 3A, a specific example is shown in which three keywords are selected from a spoken sentence that is translated into text. The sentence is "After dinner, we are going shopping and then to see a movie." The three keywords are selected based upon events and objects, while other words are deemed not to be relevant and are ignored. Once selected, keyword "Dinner" 310(1) may be provided to geo-targeting advertising service 110, in combination with geolocation information, to trigger the display of advertising material directed to nearby restaurants shown at reference numeral 315(1). Keyword "Shopping" 310(2) may trigger display of advertisements related to nearby shopping centers or individual stores shown at reference numeral 315(2). Likewise, keyword "movie" 310(3) may trigger display of advertisements related to nearby movie theaters as shown at reference numeral 315(3). In still further examples, keywords supplied to geo-targeted advertising service 110 as phrases, such as "Italian Restaurant" may return multiple advertisements which correspond to nearby Italian restaurants. Geo-targeting advertising services may return advertisements from performing a search on a word stem, e.g., searching for the stem "Ital" instead of "Italian", to return, e.g., associated advertisements corresponding to "Little Italy Restaurant", "Maggie's Italian Eatery", etc. The user may refine searches by selecting a desired distance from an endpoint device to a particular destination. The geo-targeting advertising service 110 may also perform searches with synonyms of submitted words and return corresponding results to endpoint device 105.

In still other aspects, keywords, as well as associated advertisement information, may be stored and retrieved for display during subsequent communication sessions within a specified time period. For example, keywords of previous communication sessions may be stored by the processor 160 for later retrieval. In this scenario, a keyword such as "Movie", identified during a subsequent communication session, would be checked against stored data to determine if a previous entry exists. If so, the previously stored information corresponding to this particular keyword would be retrieved by the processor and supplied to display screen 140. In still other embodiments, the endpoint device may retain advertisements that were selected for further review by users, to generate a metric of relevance or popularity, and may rank advertisements in a particular order for display based upon this information.

In still other examples, these techniques may be useful for applications in regular voice-only calls, provided that the user has a display screen associated with the endpoint device used for the voice-only call. For example, in response to a keyword identified and sent to a geo-targeting advertising service, a user could receive one or more text messages/emails in response to spoken keywords. Other embodiments may be envisioned in which targeted advertising may be supported in a cloud-based video environment.

Figure 3B:
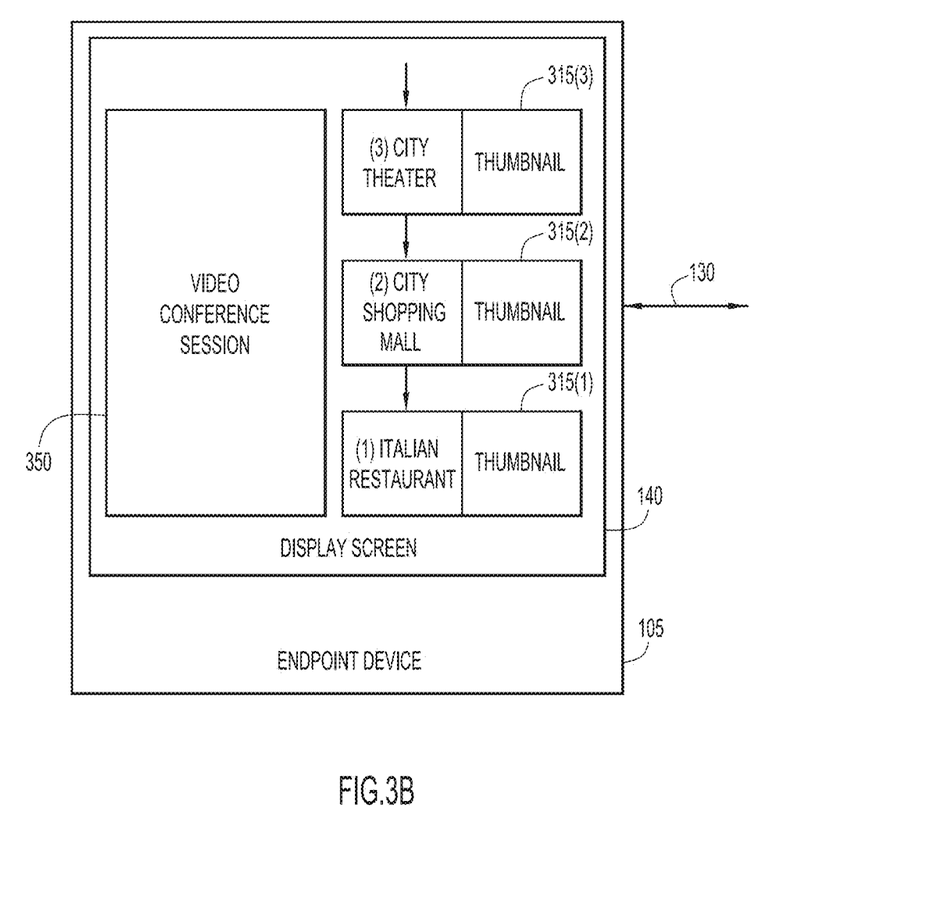
FIG. 3B is an illustration of an example endpoint device display screen on which multiple advertisements are displayed, according to an aspect of the techniques disclosed herein.

Referring now to FIG. 3B and continuing with the example of FIG. 3A, a technique is shown for precisely managing the order or sequence in which advertisements are presented to a user of the endpoint device. In particular, advertisements are presented in a sequence (from top to bottom, bottom to top, left to right, right to left, etc.) that tracks the occurrence of a keyword obtained for captured audio. For example, the first advertisement may be displayed in the upper right portion of the display screen 140, where the first advertisement 315(1) corresponds to an advertisement related to "dinner", and "dinner" is the first identified keyword in the example of FIG. 3A. Once the second keyword is identified, supplied to the geo-targeting advertising service, and corresponding results returned to endpoint device 105, a second advertisement 315(2) may be displayed in the upper right hand corner of display screen 140 and the first advertisement 315(1) may scroll to the middle of the screen. Likewise, the third keyword may return advertisements associated with keywords corresponding to nearby theaters 315(3) and that would replace the second advertisement 315(2) in the top position on the display screen 140.

As new keywords are continually selected from an ongoing conversation, sent to the advertising service, and advertisement information returned, display screen 140 of the endpoint device 105 may be continually updated in response to the results from the geo-targeting advertising service. Advertisements may be displayed as overlay images, as described previously in conjunction with FIG. 2. During continuous/repeated updating of advertisements, video conference session 350 may continue without interruption via video stream 130 and a previous advertisement may be moved to a less prominent position on the display to be replaced by a current advertisement in the more prominent position.

It is understood that multiple advertisements may be retrieved from a single keyword search. A one-to-one correlation between keywords and advertisements is shown in this example for illustrative purposes and for simplicity, and not by way of limitation.

Figure 4A:
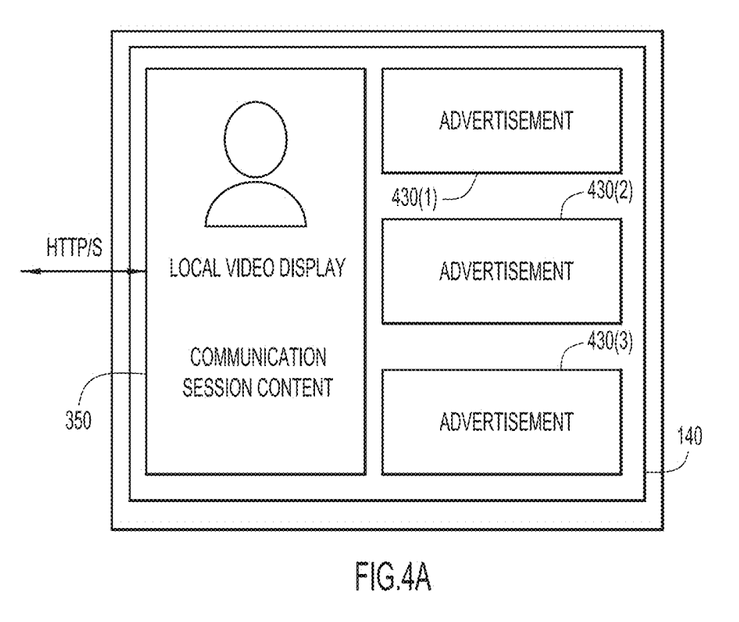
FIGS. 4A and 4B are examples of advertisement content displayed on an endpoint device according to the techniques disclosed herein.
Figure 4B:
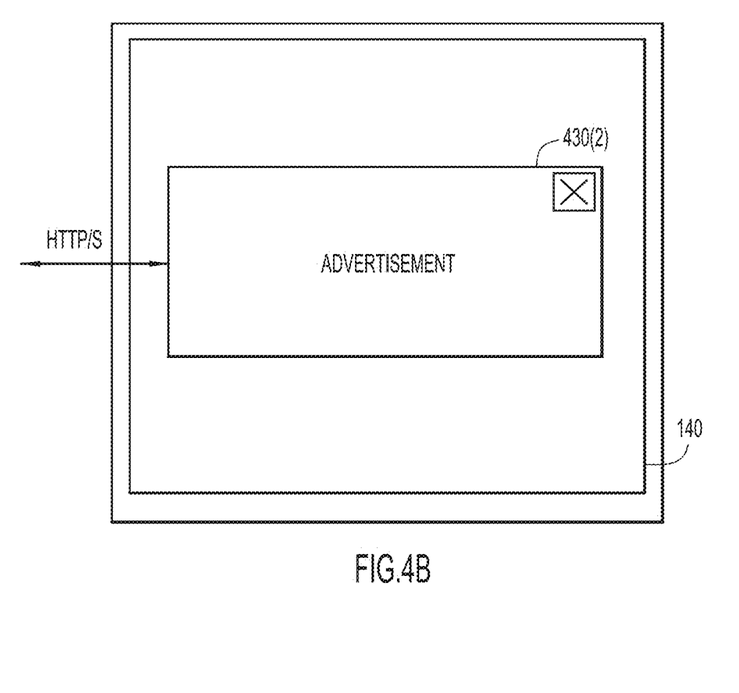

FIGS. 4A and 4B shows two examples of displaying advertisements on display screen 140. In the first illustration, shown in FIG. 4A, there is a window/section 350 reserved for display of communication session video, and a separate section of the display screen where multiple advertisements 430(1)-430(3) are presented along the right side portion of display screen 140. An overlay image, containing advertisements 430(1)-430(3), may be placed in a small portion of the display screen so as not to significantly obscure the window 350 containing the communication session content. Additionally, overlay images may be placed on top of other overlay images, allowing a user to close an existing overlay image of an advertisement via touch screen or other input device in order to view previously sent advertisements. In this example, a thumbnail image corresponding to each received advertisement may be displayed on a display screen of the device while audio is being captured at the device. As audio is being captured at the device, a plurality of thumbnail images may be displayed, with each thumbnail image corresponding to a received advertisement, wherein the plurality of thumbnail images scroll across the display screen of the device. A scroll bar (not shown) may also be present on the display screen to allow access to previously displayed images.

FIG. 4B shows an example of the content of the display screen 140 when a particular advertisement 430(2) is selected by a user. The selected advertisement 430(2) may be enlarged and occupy a majority of the display area of video display screen 140. Thus, a user input to select a particular thumbnail image may be received that results in a complete display of the corresponding advertisement on the display screen of the device. The advertisement may take the user to a web page, or present them with streaming media corresponding to the advertisement. A user has the option to close an advertisement at any time. Additionally, overlay advertisements may be accessible (remain on-screen) for a given period of time after completion of the video communication session, allowing a user to scroll through and access advertisements that were previously displayed during the live communication session between individuals. An input from a user may be received that causes previously displayed thumbnail images that have scrolled off the display screen to be retrieved and reappear on the display screen.

In other examples, a scroll bar or other mechanism may be provided, allowing a user to retrieve advertisements that are no longer currently displayed on display screen 140. A user could utilize the scroll bar to return to advertisements displayed earlier in a video or teleconference session.

Figure 5:
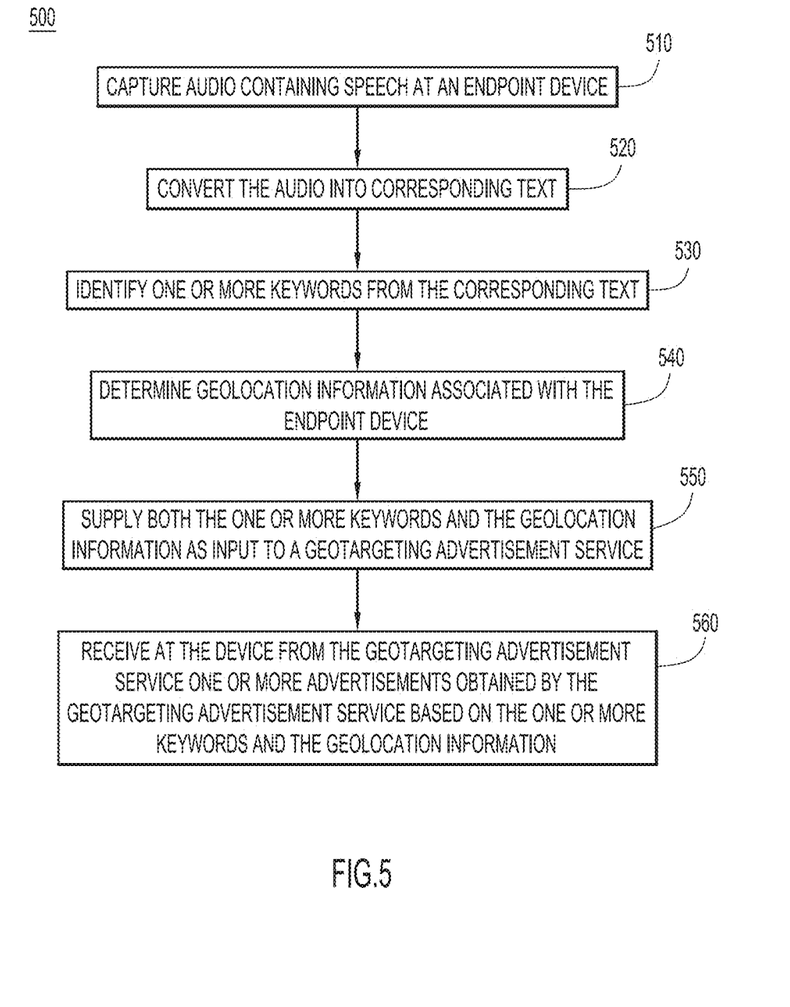
FIG. 5 is a flow chart depicting operations performed at the endpoint device according to the techniques disclosed herein.

FIG. 5 shows a flow chart depicting operations performed by endpoint device 105 according to the techniques described herein. At operation 510, audio signals containing speech at an endpoint device are captured. At operation 520, the captured audio input is converted or translated into corresponding text. At operation 530, one or more keywords are identified and selected from the translated text. At operation 540, geolocation information associated with the endpoint device is determined. At operation 550, both the one or more keywords and the geolocation information may be supplied (sent) as input to a geo-targeting advertising service. At operation 560, the endpoint device receives from the geo-targeting advertisement service one or more advertisements obtained by the geo-targeting advertisement service based on the one or more keywords and the geolocation information. As explained above, operations 510-560 may be performed continuously/repeatedly over time to update or present new advertisements on the endpoint device.

Figure 6:
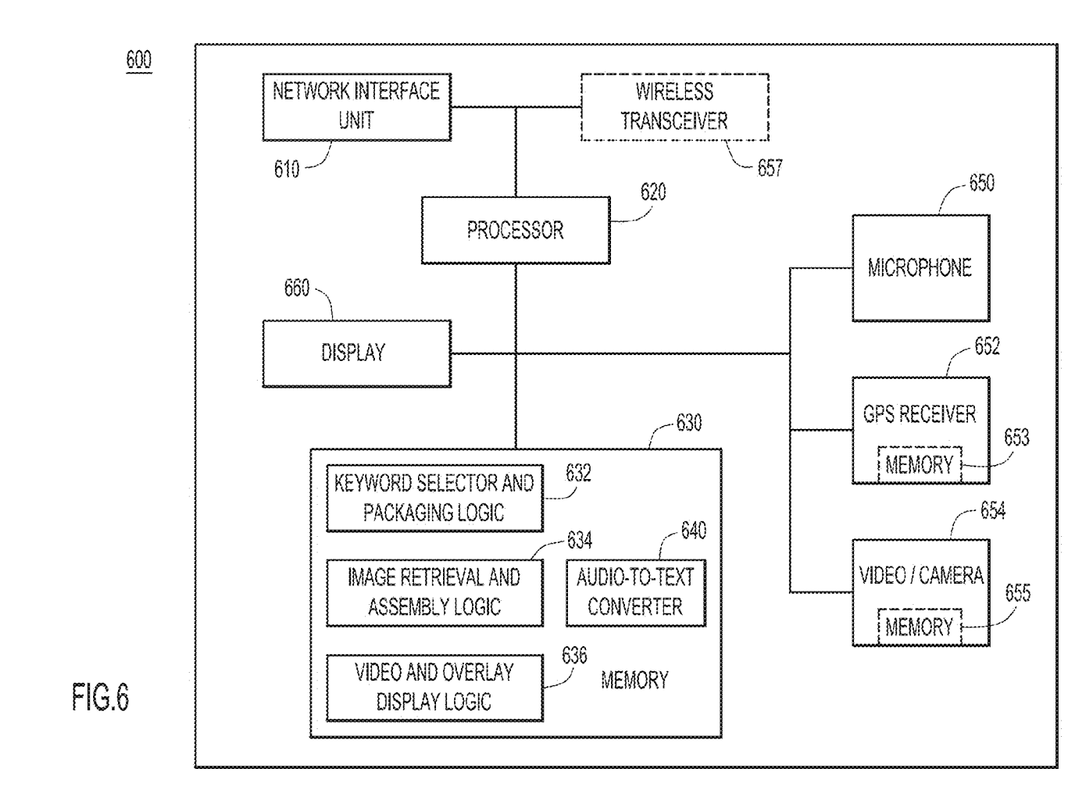
FIG. 6 is a more detailed block diagram of the endpoint device capable of sending and receiving information to a geo-targeting advertisement service, according to the techniques presented herein.

FIG. 6 illustrates an example block diagram of an apparatus 600 (e.g., a physical device) configured to perform the techniques presented herein. The apparatus 600 shown in FIG. 6 is a more complete block diagram of an endpoint device 105 referred to above. The apparatus 600 includes a network interface unit 610, a processor 620, a memory 630 and a display 660. Apparatus 600 also includes a microphone 650, a GPS receiver 652, which may optionally contain memory 653, a camera 654, which may optionally contain memory 655, and a wireless transceiver 657. The network interface unit 610 is configured to enable network communications by interfacing with a network. While conceptually illustrated as a "network interface unit," it will be appreciated that a physical device may contain more than one network interface or type of interface to communicate with other devices within a network. It is also understood that wireless transceiver 657 may be located separately from or be integrated with the network interface unit 610.

The processor 620 may be embodied by one or more microprocessors or microcontrollers and executes keyword selector and packaging logic 632, image retrieval and assembly logic 634 as well as video and overlay display logic 636 in accordance with the techniques presented herein in connection with FIGS. 1-5. The processor 620 executes software instructions for audio-to-text converter 640 as well in order to convert detected audio to text for keyword analysis. The memory 630 may store software instructions for keyword selector and packaging logic 632, image retrieval and assembly logic 634, video and overlap display logic 636, as well as audio-to-text converter 640.

Memory 630 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 630 may comprise one or more tangible (e.g., non-transitory) computer readable storage media (e.g., a memory device) encoded with software comprising computer executable instructions, and when the software is executed by the processor 620, the processor 620 is operable to perform the operations described herein in connection with keyword selector and packaging logic 632, image retrieval and assembly logic 634, video and overlay display logic 636, and audio-to-text converter 640. In other approaches, keyword selector and packaging logic 632, image retrieval and assembly logic 634, video and overlay display logic 636, and audio-to-text converter 640 are stored remotely, external to endpoint device 105 but accessible by processor 620.

The functions of the processor 620 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

Microphone 650 may receive audio input and convert such input into electrical signals which are then converted into text using audio-to-text converter 640. GPS receiver 652 may interface through wireless transceiver 657 or network interface unit 610 to receive GPS signals used to determine the location of the device 600. Display 660 may be used to display advertisements, selected based upon keyword and location input as described herein.

The techniques disclosed herein may be utilized in mobile wireless endpoint devices (e.g., cell phones), public kiosks, video conference software based products like Skype®, as well as many other video communication products. The techniques disclosed herein do not require a keyboard interface, as communication is performed live with an audio or video interface, and therefore provide the ability to target real-time advertisements to a variety of communication devices. This technology may also be leveraged by mobile wireless providers who offer free video services, but also allowing subscribers to opt out of receiving advertisements by purchasing an advertisement-free version of the service. Additionally, this technology would be applicable to service providers who offer business level conference services, such as Cisco Systems Telepresence systems, cloud operators who offer video conferencing services, wireless carriers who provide video services, etc.

Advantages of the techniques presented herein include an advertising system that is keyword or topic aware, is based upon the identification of keywords in real-time, and is not limited to requiring text input, e.g., from a keyboard. Criteria such as geographic location are also taken into consideration prior to presenting advertisements to video conference users. Such techniques may be used to establish a source of revenue to service providers and hosts of video conferencing platforms.

In sum, techniques are presented which integrate speech recognition to extract context from a voice or video call for the purpose of presenting targeted advertising to users of the voice or video service. Advertisements may appear on mobile devices, voice and video endpoints and will reflect the content of calls, not just meta-data or content from web sessions, email history, previous searches and other sources of context currently utilized for advertising services.

The techniques discussed herein need not be limited to real-time voice communications, but may encompass any form of communication that occurs in real-time. By real-time, it is meant that advertisements are generated on a rolling basis in response to ongoing communication as part of an audio or video telecommunication session in the context of live communication between one or more individuals. Response times from a geo-targeting advertising service may be based upon available network bandwidth, speed of connectivity, processing capabilities of the endpoint device, operating load on the geo-advertising engine, etc.

A method is provided comprising capturing audio containing speech at a device and converting the audio into corresponding text. One or more keywords are identified from the corresponding text, and geolocation information associated with the device is determined. Both the one or more keywords and the geolocation information are supplied as input to a geo-targeting advertisement service so as to cause the geo-targeting advertisement service to identify relevant content based on both the geolocation information and the one or more keywords. The device receives, from the geo-targeting advertisement service, one or more advertisements obtained by the geo-targeting advertisement service based on the one or more keywords and the geolocation information.

An apparatus is also provided comprising a microphone configured to capture audio containing speech at a device, a network interface unit configured to receive communications over a network, a display screen configured to display information associated with one or more advertisements, and a processor coupled to the network interface unit. The processor is configured to convert the audio received from the microphone into corresponding text, identify one or more keywords from the corresponding text, determine geolocation information associated with the device, and supply both the one or more keywords and the geolocation information as input to a geo-targeting advertisement service so as to cause the geo-targeting advertisement service to identify relevant content based on both the geolocation information and the one or more keywords. The device receives from the geo-targeting advertisement service one or more advertisements obtained by the geo-targeting advertisement service based on the one or more keywords and the geolocation information.

Further, one or more non-transitory computer readable storage media are provided, encoded with software comprising computer executable instructions, and when the software is executed operable to capture audio containing speech at a device, convert the audio into corresponding text, and identify one or more keywords from the corresponding text. Geolocation information associated with the device is determined, and both the one or more keywords and the geolocation information are supplied as input to a geo-targeting advertisement service so as to cause the geo-targeting advertisement service to identify relevant content based on both the geolocation information and the one or more keywords. The device receives from the geo-targeting advertisement service one or more advertisements obtained by the geo-targeting advertisement service based on the one or more keywords and the geolocation information.

The above description is intended by way of example only. Various modifications and structural changes may be made therein without departing from the scope of the concepts described herein and within the scope and range of equivalents of the claims.

What is claimed is:

1. A method comprising:
    capturing audio containing speech during a video conference session at a device participating in the video conference session;
    converting the audio into corresponding text;
    identifying one or more keywords from the corresponding text;
    determining geolocation information associated with the device;
    supplying both the one or more keywords and the geolocation information as input to a geo-targeting advertisement service so as to cause the geo-targeting advertisement service to identify relevant content based on both the geolocation information and the one or more keywords;
    receiving at the device from the geo-targeting advertisement service one or more advertisements obtained by the geo-targeting advertisement service based on the one or more keywords and the geolocation information; and
    displaying, on a display screen of the device as the one or more keywords are identified during the video conference session, a plurality of thumbnail images, wherein each of the thumbnail images corresponds to an advertisement from the one or more advertisements received at the device and the plurality of thumbnail images are displayed in a sequence that tracks an order in which the one or more keywords are identified, with more recent thumbnail images of the plurality of thumbnail images continuously displacing less recent thumbnail images from prominent display positions on the display screen.

2. The method of claim 1, wherein supplying further comprises sending the one or more keywords and the geolocation information in a markup language format contained within a message to the geo-targeting advertisement service.

3. The method of claim 1, wherein determining the geolocation information comprises determining a location of the device.

4. The method of claim 1, further comprising fetching from one or more external sources associated with the one or more advertisements, corresponding image data for use in displaying the plurality of thumbnail images on the display screen of the device.

5. The method of claim 1, wherein capturing comprises repeatedly capturing audio at the device, converting comprises repeatedly converting speech contained in the audio into corresponding text, identifying comprises repeatedly identifying one or more keywords from the corresponding text, and wherein supplying comprises repeatedly supplying one or more keywords and associated geolocation information to the geo-targeting advertisement service as audio is captured at the device.

6. The method of claim 1, further comprising:
    upon receiving a user selection of a particular thumbnail image from the plurality of thumbnail images, completely displaying a corresponding advertisement on the display screen of the device together with additional content related to the corresponding advertisement.

7. The method of claim 1, wherein the plurality of thumbnail images scroll across the display screen of the device.

8. The method of claim 7, further comprising receiving an input from a user that causes previously displayed images that have scrolled off the display screen to reappear on the display screen.

9. An apparatus comprising:
    a microphone configured to capture audio containing speech during a video conference session at a device participating in the video conference session;
    a network interface unit configured to receive communications over a network;
    a display screen configured to display information associated with one or more advertisements; and
    a processor coupled to the network interface unit, and configured to:
        convert the audio received from the microphone into corresponding text;
        identify one or more keywords from the corresponding text;
        determine geolocation information associated with the device;
        supply both the one or more keywords and the geolocation information as input to a geo-targeting advertisement service so as to cause the geo-targeting advertisement service to identify relevant content based on both the geolocation information and the one or more keywords;
        receive at the device from the geo-targeting advertisement service one or more advertisements obtained by the geo-targeting advertisement service based on the one or more keywords and the geolocation information; and
        display, on the display screen of the device as the one or more keywords are identified during the video conference session, a plurality of thumbnail images, wherein each of the thumbnail images corresponds to an advertisement from the one or more advertisements received at the device and the plurality of thumbnail images are displayed in a sequence that tracks an order in which the one or more keywords are identified, with more recent thumbnail images of the plurality of thumbnail images continuously displacing less recent thumbnail images from prominent display positions on the display screen.

10. The apparatus of claim 9, wherein the processor is further configured to send the one or more keywords and the geolocation information in a markup language format contained within a message to the geo-targeting advertisement service.

11. The apparatus of claim 9, wherein the processor is further configured to determine the geolocation information by determining a location of the device.

12. The apparatus of claim 9, wherein the processor is further configured to fetch from one or more external sources associated with the one or more advertisements, corresponding image data for use in displaying the plurality of thumbnail images on the display screen of the device.

13. The apparatus of claim 9, wherein the processor is configured to:
repeatedly convert speech contained in the audio into corresponding text;
repeatedly identify one or more keywords from the corresponding text; and
repeatedly supply one or more keywords and associated geolocation information to the geo-targeting advertisement service as audio is captured at the device.

14. The apparatus of claim 9, wherein the processor is further configured to:
upon receiving a user selection of a particular thumbnail image from the plurality of thumbnail images, completely display a corresponding advertisement on the display screen together with additional content related to the corresponding advertisement.

15. The apparatus of claim 9, wherein the plurality of thumbnail images scroll across the display screen.

16. The apparatus of claim 15, wherein the processor is further configured to receive an input from a user that causes previously displayed images that have scrolled off the display screen to reappear on the display screen.

17. One or more non-transitory computer readable storage media encoded with software comprising computer executable instructions and when the software is executed operable to:
capture audio containing speech during a video conference session at a device participating in the video conference session;
convert the audio into corresponding text;
identify one or more keywords from the corresponding text;
determine geolocation information associated with the device;
supply both the one or more keywords and the geolocation information as input to a geo-targeting advertisement service so as to cause the geo-targeting advertisement service to identify relevant content based on both the geolocation information and the one or more keywords;
receive at the device from the geo-targeting advertisement service one or more advertisements obtained by the geo-targeting advertisement service based on the one or more keywords and the geolocation information; and
display, on a display screen of the device as the one or more keywords are identified during the video conference session, a plurality of thumbnail images, wherein each of the thumbnail images corresponds to an advertisement from the one or more advertisements received at the device and the plurality of thumbnail images are displayed in a sequence that tracks an order in which the one or more keywords are identified, with more recent thumbnail images of the plurality of thumbnail images continuously displacing less recent thumbnail images from prominent display positions on the display screen.

18. The non-transitory computer readable storage media of claim 17, further comprising computer executable instructions operable to send the one or more keywords and the geolocation information in a markup language format contained within a message to the geo-targeting advertisement service.

19. The non-transitory computer readable storage media of claim 17 further comprising computer executable instructions operable to determine the geolocation information by determining a location of the device.

20. The non-transitory computer readable storage media of claim 17, further comprising computer executable instructions operable to fetch from one or more external sources associated with the one or more advertisements, corresponding image data for use in displaying the plurality of thumbnail images on the display screen of the device.

21. The non-transitory computer readable storage media of claim 17, further comprising computer executable instructions operable to:
repeatedly capture audio at the device;
repeatedly convert speech contained in the audio into corresponding text;
repeatedly identify one or more keywords from the corresponding text; and
repeatedly supply one or more keywords and associated geolocation information to the geo-targeting advertisement service as audio is captured at the device.

22. The non-transitory computer readable storage media of claim 17, further comprising computer executable instructions operable to:
upon receiving a user selection of a particular thumbnail image from the plurality of thumbnail images, completely display a corresponding advertisement on the display screen of the device together with additional content related to the corresponding advertisement.

23. The non-transitory computer readable storage media of claim 17, wherein the plurality of thumbnail images scroll across the display screen of the device.

24. The non-transitory computer readable storage media of claim 23, further comprising computer executable instructions operable to receive an input from a user that causes previously displayed images that have scrolled off the display screen to reappear on the display screen.

* * * * *